US012656154B2

(12) United States Patent
Ji et al.

(10) Patent No.: US 12,656,154 B2
(45) Date of Patent: Jun. 16, 2026

(54) DISTRIBUTED FIBER OPTIC SENSOR PLACEMENT PROCEDURE FOR MULTI-CHANNEL SENSORS

(71) Applicant: NEC Laboratories America, Inc., Princeton, NJ (US)

(72) Inventors: Philip Ji, Cranbury, NJ (US); Ting Wang, West Windsor, NJ (US); Zilong Ye, La Verne, CA (US)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 18/890,388

(22) Filed: Sep. 19, 2024

(65) Prior Publication Data

US 2025/0334428 A1      Oct. 30, 2025

Related U.S. Application Data

(60) Provisional application No. 63/590,840, filed on Oct. 17, 2023.

(51) Int. Cl.
    G01D 5/353 (2006.01)
    G01H 9/00 (2006.01)
(52) U.S. Cl.
    CPC ......... G01D 5/35358 (2013.01); G01H 9/004 (2013.01)

(58) Field of Classification Search
    CPC .... G01D 5/32; G01D 5/35358; G01D 5/3537; G01H 9/004
    See application file for complete search history.

(56) References Cited

U.S. PATENT DOCUMENTS

| | | | |
|---|---|---|---|
| 2022/0057254 A1* | 2/2022 | Ji | G02F 1/295 |
| 2023/0152130 A1* | 5/2023 | Huang | G01D 5/35361 |
| | | | 73/655 |

* cited by examiner

*Primary Examiner* — Kevin K Pyo
(74) *Attorney, Agent, or Firm* — Vincent Duffy

(57) ABSTRACT

Disclosed is a DFOS placement procedure for multi-channel sensors we call "modified Explore aNd Pick" (mEnP) procedure, which helps network carriers deploy new types of DFOS sensors (e.g., each DFOS sensor is associated with multiple sensing fiber routes/channels) to cover/sense entire network infrastructures with a minimum number of DFOS sensors while advantageously providing network carriers 1) locations where to deploy DFOS sensors and, (2) how to establish sensing fiber routes/channels from the deployed sensors. Our inventive procedure includes two sub-procedures. The first sub-procedure adopts a modified route exploration method to obtain a set S that contains all the possible sensor placements and the corresponding sensing fiber routes/channels at each node in the given network infrastructure. A second sub-procedure applies a modified greedy set cover method to find the minimum subset from S that can cover all the network links in the given network infrastructure.

5 Claims, 13 Drawing Sheets

DAC: Digital-to-analog converter
ADC: Analog-to-digital converter
DSP: Digital signal processing
WDM: Wavelength division multiplexer
BPF: Band-pass filter
LPF: Low-pass filter

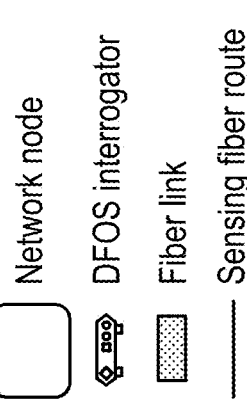
Network node
DFOS interrogator
Fiber link
Sensing fiber route
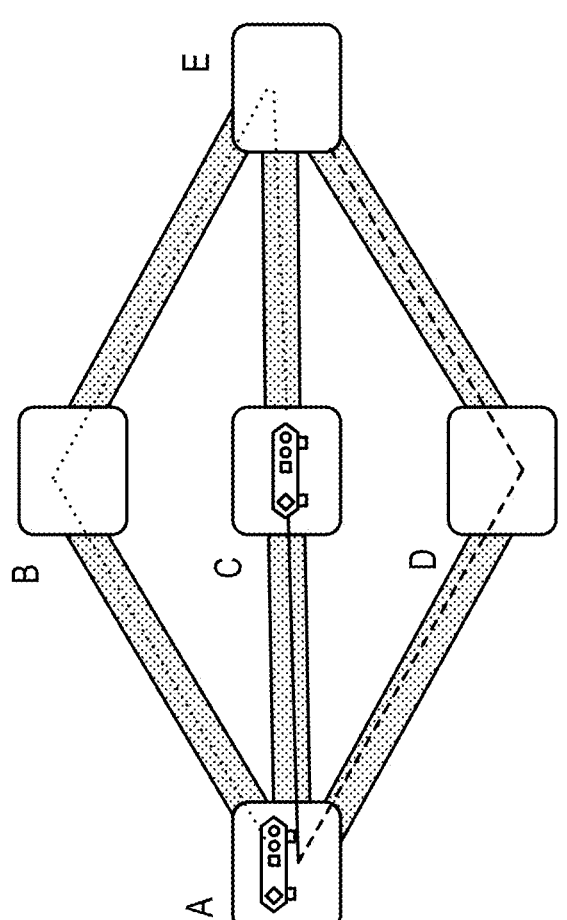
*FIG. 6(A)*

Network node

DFOS interrogator

Fiber link

Sensing fiber route

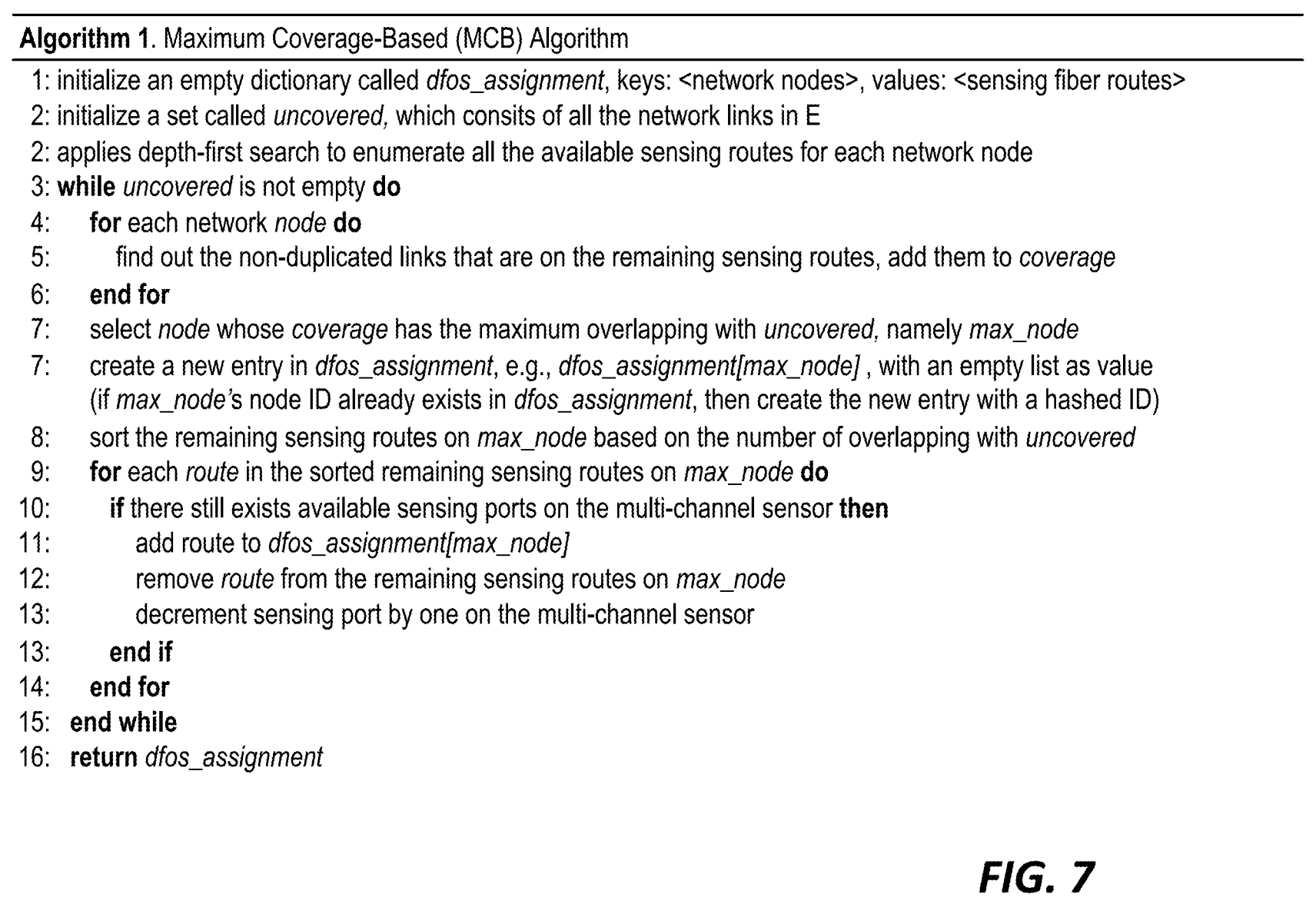

Algorithm 1. Maximum Coverage-Based (MCB) Algorithm

1: initialize an empty dictionary called *dfos_assignment*, keys: <network nodes>, values: <sensing fiber routes>

2: initialize a set called *uncovered*, which consits of all the network links in E 2: applies depth-first search to enumerate all the available sensing routes for each network node 3: while *uncovered* is not empty do

4:     for each network *node* do

5:        find out the non-duplicated links that are on the remaining sensing routes, add them to *coverage*

6:     end for

7:     select *node* whose *coverage* has the maximum overlapping with *uncovered*, namely *max_node*

7:     create a new entry in *dfos_assignment*, e.g., *dfos_assignment[max_node]*, with an empty list as value (if *max_node*'s node ID already exists in *dfos_assignment*, then create the new entry with a hashed ID)

8:     sort the remaining sensing routes on *max_node* based on the number of overlapping with *uncovered*

9:     for each *route* in the sorted remaining sensing routes on *max_node* do

10:        if there still exists available sensing ports on the multi-channel sensor then

11:           add *route* to *dfos_assignment[max_node]*

12:           remove *route* from the remaining sensing routes on *max_node*

13:           decrement sensing port by one on the multi-channel sensor

13:        end if

14:     end for

15: end while

16: return *dfos_assignment*

*FIG. 7*

Simulation network parameters

| Network | Oxford | Palmetto | ION | USC | 4×4 |
|---|---|---|---|---|---|
| No. of nodes | 19 | 43 | 95 | 150 | 16 |
| No. of links | 24 | 63 | 92 | 166 | 24 |
| Ave. degree | 2.53 | 2.93 | 1.94 | 2.21 | 3 |
| Ave. link att. | 10.29 | 11.37 | 7.76 | 10.09 | 9 |

*FIG. 8(A)*

Simulation results

| Network | Oxford | Palmetto | ION | USC | 4×4 |
|---|---|---|---|---|---|
| Single-channel ILP | 17 | 52 | * | * | 24 |
| Single-channel R.F | 21 | 59 | 76 | 155 | 24 |
| Single-channel EnP | 19 | 54 | 60 | 130 | 24 |
| Multi-channel MCB | 7 | 19 | 28 | 54 | 8 |

*: unable to yield a result in a reasonable amount of time

FIG. 8(B)

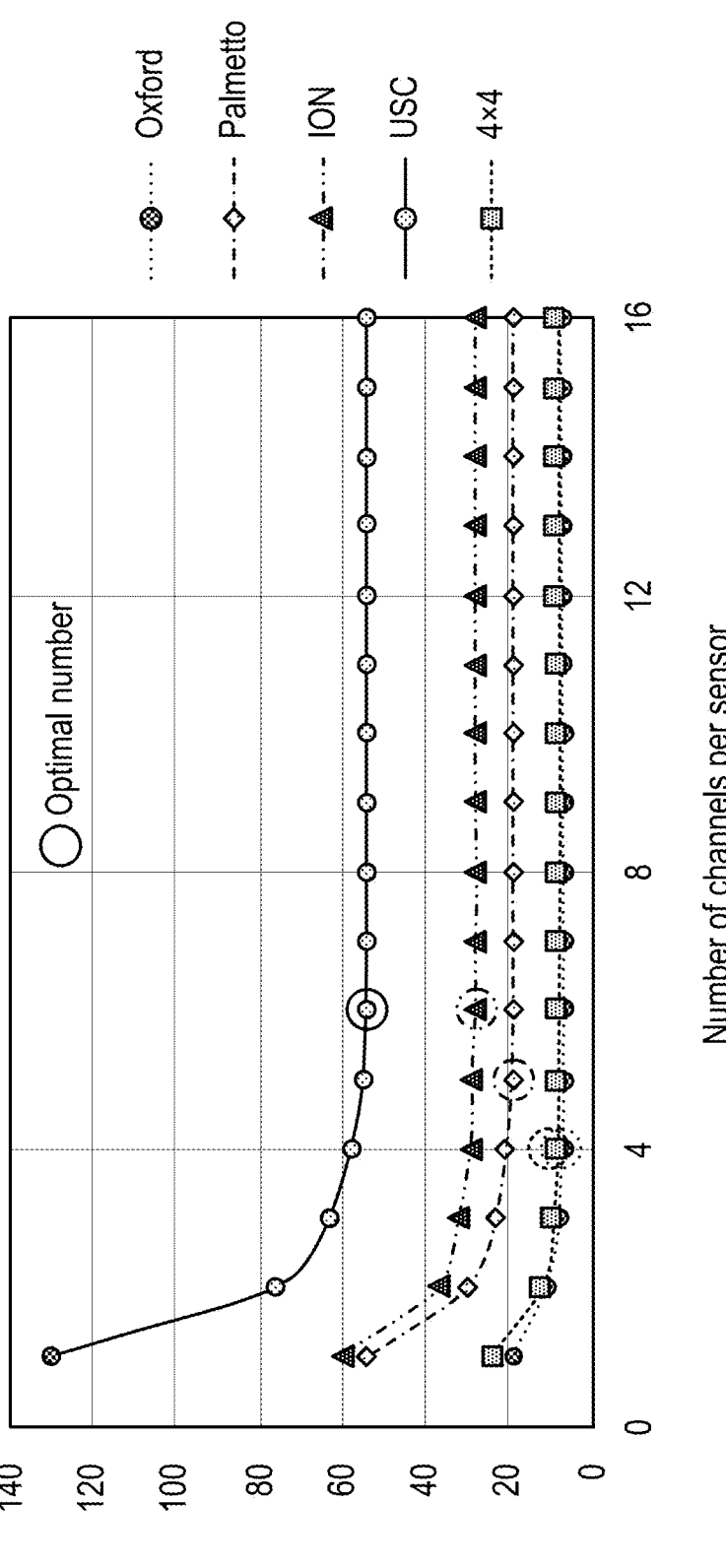
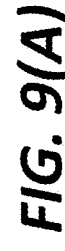
*FIG. 9(A)*

DISTRIBUTED FIBER OPTIC SENSOR PLACEMENT PROCEDURE FOR MULTI-CHANNEL SENSORS

CROSS-REFERENCE TO RELATED APPLICATIONS

This application claims the benefit of U.S. Provisional Patent Application Ser. No. 63/590,840 filed Oct. 17, 2023, the entire contents of which is incorporated by reference as if set forth at length herein.

FIELD OF THE INVENTION

This application relates generally to distributed fiber optic sensing (DFOS) systems, methods, structures, and related technologies. More particularly, it pertains to placement procedure for DFOS multi-channel sensors.

BACKGROUND OF THE INVENTION

Distributed fiber optic sensing (DFOS) systems, methods, and structures have found widespread utility in contemporary industry and society. Of particular importance, DFOS techniques have been used to usher in a new era of Infrastructure as a Sensor (IaaSr), also known as Network as a Sensor (NaaSr).

Toward this end, and as further evidence of the societal and economic importance of IaaSr/NaaSr efforts, network carriers may soon devote their time and investment to upgrade their network infrastructures to include such IaaSr services, in order to improve their operational efficiency, and to further increase their profit and market share. When network carriers upgrade their infrastructures with DFOS to provide IaaSr services however, there will arise a critical challenge namely, how to deploy DFOS sensors to cover the whole network infrastructures with minimum cost of DFOS sensors. This is the so-called DFOS sensor placement problem.

Previously, we have developed and disclosed in United States Patent Application Publication No. 2022/0057254 a distributed fiber optic sensing (DFOS), sensor placement procedure that provides a desirable sensor coverage over a network at minimal cost. This previous work does not provide for multi-channel sensor placement, however.

SUMMARY OF THE INVENTION

The above problem is solved and an advance in the art is made according to aspects of the present disclosure directed to a distributed fiber optic sensor placement procedure for multi-channel sensors.

In sharp contrast to the prior art, we now disclose a modified version of our previous work, we call "modified Explore aNd Pick" (mEnP) procedure, which helps network carriers deploy new types of DFOS sensors (e.g., each DFOS sensor is associated with multiple sensing fiber routes/channels) to cover/sense entire network infrastructures with a minimum number of DFOS sensors. Our inventive approach advantageously provides network carriers 1) locations where to deploy DFOS sensors and, (2) how to establish sensing fiber routes/channels from the deployed sensors.

As we shall show and describe, our inventive procedure generally comprises two sub-procedures. The first sub-procedure adopts a modified route exploration method from our previous work to obtain a set S that contains all the possible sensor placements and the corresponding sensing fiber routes/channels at each node in the given network infrastructure.

A novel, second sub-procedure applies a modified greedy set cover method to find the minimum subset from S that can cover all the network links in the given network infrastructure.

BRIEF DESCRIPTION OF THE DRAWING

FIG. 6(A) and FIG. 6(B) are schematic diagrams showing illustrative examples of: FIG. 6(A) single-channel sensor placement vs FIG. 6(B) multi-channel sensor placement according to aspects of the present disclosure.

FIG. 7 is a pseudo-code listing of Algorithm 1—Maximum Coverage-Based (MCB) Algorithm according to aspects of the present disclosure.

FIG. 8(A) and FIG. 8(B) show in tabular form: FIG. 8(A) simulation network parameters, and FIG. 8(B) simulation results or our experimental efforts, according to aspects of the present disclosure.

FIG. 9(A) and FIG. 9(B) are a pair of plots showing illustrative sensor placement analysis of: FIG. 9(A) sensor number vs. channel number, and FIG. 9(B) number of sensors vs sensor power budget, according to aspects of the present disclosure.

DETAILED DESCRIPTION OF THE INVENTION

Figure 1A:
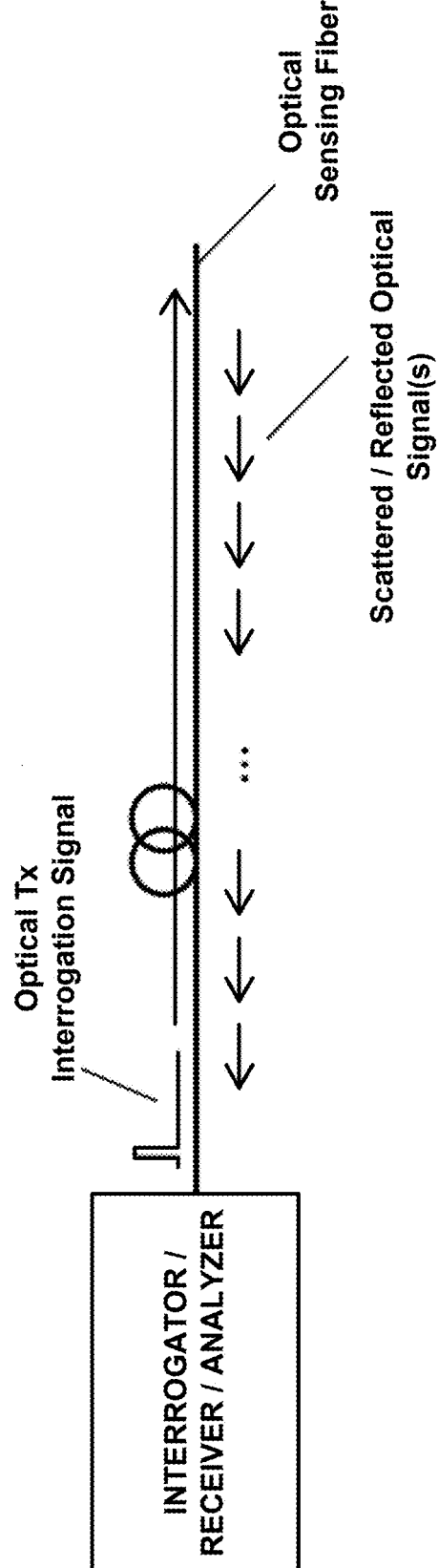
FIG. 1(A) and FIG. 1(B) are schematic diagrams showing an illustrative prior art uncoded and coded DFOS systems.

The following merely illustrates the principles of this disclosure. It will thus be appreciated that those skilled in the art will be able to devise various arrangements which, although not explicitly described or shown herein, embody the principles of the disclosure and are included within its spirit and scope.

Furthermore, all examples and conditional language recited herein are intended to be only for pedagogical purposes to aid the reader in understanding the principles of the disclosure and the concepts contributed by the inventor (s) to furthering the art and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that any block diagrams herein represent conceptual views of illustrative circuitry embodying the principles of the disclosure.

Unless otherwise explicitly specified herein, the FIGs comprising the drawing are not drawn to scale.

By way of some additional background, we note that distributed fiber optic sensing systems convert the fiber to an array of sensors distributed along the length of the fiber. In effect, the fiber becomes a sensor, while the interrogator generates/injects laser light energy into the fiber and senses/detects events along the fiber length.

As those skilled in the art will understand and appreciate, DFOS technology can be deployed to continuously monitor vehicle movement, human traffic, excavating activity, seismic activity, temperatures, structural integrity, liquid and gas leaks, and many other conditions and activities. It is used around the world to monitor power stations, telecom networks, railways, roads, bridges, international borders, critical infrastructure, terrestrial and subsea power and pipelines, and downhole applications in oil, gas, and enhanced geothermal electricity generation. Advantageously, distributed fiber optic sensing is not constrained by line of sight or remote power access and—depending on system configuration—can be deployed in continuous lengths exceeding 30 miles with sensing/detection at every point along its length. As such, cost per sensing point over great distances typically cannot be matched by competing technologies.

Distributed fiber optic sensing measures changes in "backscattering" of light occurring in an optical sensing fiber when the sensing fiber encounters environmental changes including vibration, strain, or temperature change events. As noted, the sensing fiber serves as sensor over its entire length, delivering real time information on physical/environmental surroundings, and fiber integrity/security. Furthermore, distributed fiber optic sensing data pinpoints a precise location of events and conditions occurring at or near the sensing fiber.

Figure 1B:
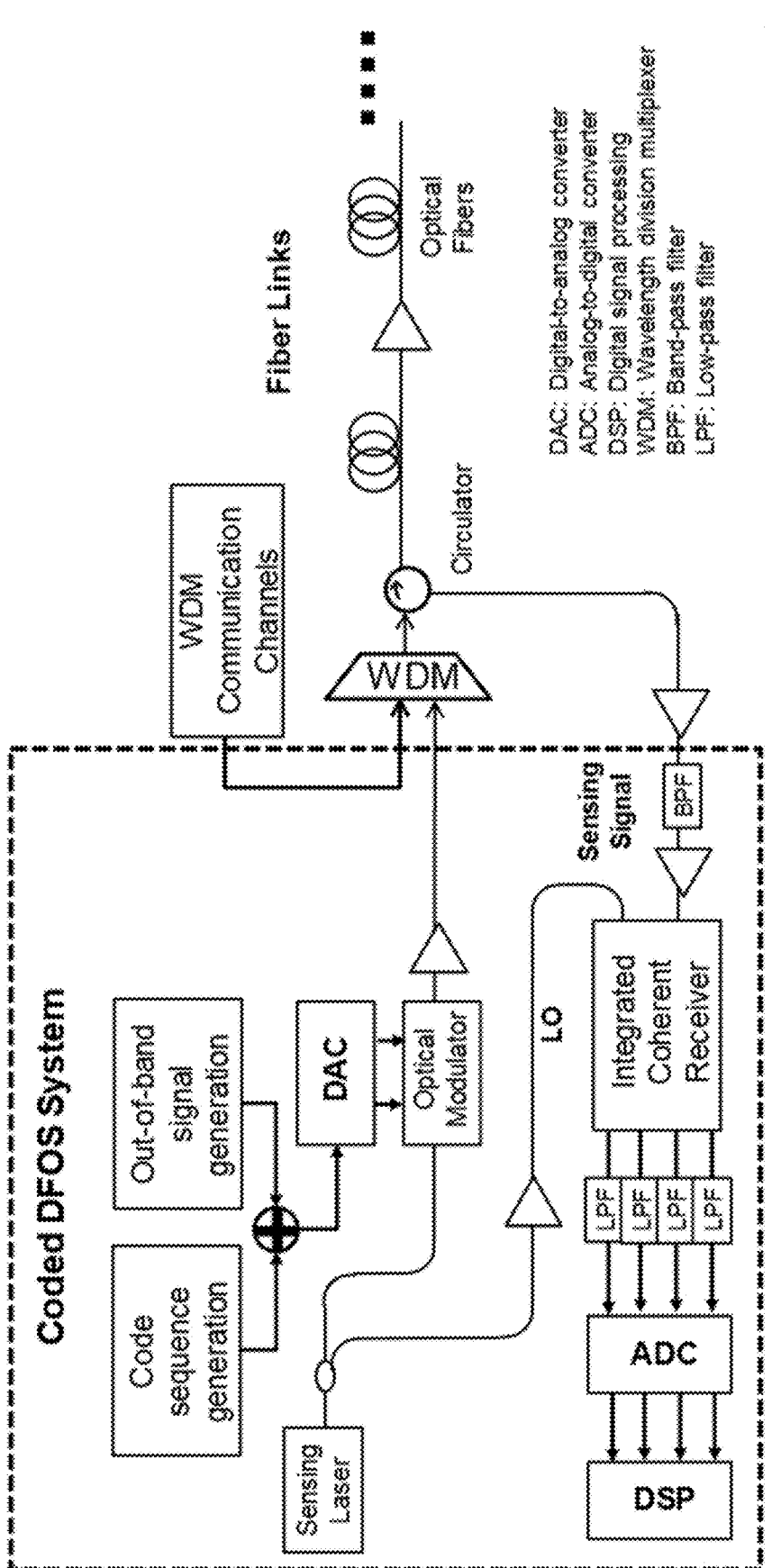

A schematic diagram illustrating the generalized arrangement and operation of a distributed fiber optic sensing system that may advantageously include artificial intelligence/machine learning (AI/ML) analysis is shown illustratively in FIG. 1(A). With reference to FIG. 1(A), one may observe an optical sensing fiber that in turn is connected to an interrogator. While not shown in detail, the interrogator may include a coded DFOS system that may employ a coherent receiver arrangement known in the art such as that illustrated in FIG. 1(B).

As is known, contemporary interrogators are systems that generate an input signal to the optical sensing fiber and detects/analyzes reflected/backscattered and subsequently received signal(s). The received signals are analyzed, and an output is generated which is indicative of the environmental conditions encountered along the length of the fiber. The backscattered signal(s) so received may result from reflections in the fiber, such as Raman backscattering, Rayleigh backscattering, and Brillion backscattering.

As will be appreciated, a contemporary DFOS system includes the interrogator that periodically generates optical pulses (or any coded signal) and injects them into an optical sensing fiber. The injected optical pulse signal is conveyed along the length optical fiber.

At locations along the length of the fiber, a small portion of signal is backscattered/reflected and conveyed back to the interrogator wherein it is received. The backscattered/reflected signal carries information the interrogator uses to detect, such as a power level change that indicates—for example—a mechanical vibration.

The received backscattered signal is converted to electrical domain and processed inside the interrogator. Based on the pulse injection time and the time the received signal is detected, the interrogator determines at which location along the length of the optical sensing fiber the received signal is returning from, thus able to sense the activity of each location along the length of the optical sensing fiber. Classification methods may be further used to detect and locate events or other environmental conditions including acoustic and/or vibrational and/or thermal along the length of the optical sensing fiber.

Of particular interest, distributed acoustic sensing (DAS) is a technology that uses fiber optic cables as linear acoustic sensors. Unlike traditional point sensors, which measure acoustic vibrations at discrete locations, DAS can provide a continuous acoustic/vibration profile along the entire length of the cable. This makes it ideal for applications where it's important to monitor acoustic/vibration changes over a large area or distance.

Distributed acoustic sensing/distributed vibration sensing (DAS/DVS), also sometimes known as just distributed acoustic sensing (DAS), is a technology that uses optical fibers as widespread vibration and acoustic wave detectors. Like distributed temperature sensing (DTS), DVS allows for continuous monitoring over long distances, but instead of measuring temperature, it measures vibrations and sounds along the fiber.

DVS operates as follows.

Light pulses are sent through the fiber optic sensor cable.

As the light travels through the cable, vibrations and sounds cause the fiber to stretch and contract slightly.

These tiny changes in the fiber's length affect how the light interacts with the material, causing a shift in the backscattered light's frequency.

By analyzing the frequency shift of the backscattered light, the DAS/DVS system can determine the location and intensity of the vibrations or sounds along the fiber optic cable.

Similar to DTS, DAS/DVS offers several advantages over traditional point-based vibration sensors: High spatial resolution: It can measure vibrations with high granularity, pinpointing the exact location of the source along the cable; Long distances: It can monitor vibrations over large areas, covering several kilometers with a single fiber optic sensor cable; Continuous monitoring: It provides a continuous picture of vibration activity, allowing for better detection of anomalies and trends; Immune to electromagnetic interference (EMI): Fiber optic cables are not affected by electrical noise, making them suitable for use in environments with strong electromagnetic fields.

DAS/DVS technology has a wide range of applications, including: Structural health monitoring: Monitoring bridges, buildings, and other structures for damage or safety concerns; Pipeline monitoring: Detecting leaks, blockages, and other anomalies in pipelines for oil, gas, and other fluids; Perimeter security: Detecting intrusions and other activities along fences, pipelines, or other borders; Geophysics: Studying seismic activity, landslides, and other geological phenomena; and Machine health monitoring: Monitoring the health of machinery by detecting abnormal vibrations indicative of potential problems.

As the technology continues to develop, DAS/DVS is expected to become even more widely used in various fields where continuous and sensitive acoustic/vibration monitoring is crucial.

With the above in mind, we note once again that the distributed fiber optical sensing (DFOS) technique has been demonstrated to provide intelligent sensing and learning applications using the existing network infrastructures. It can be used to monitor road condition/traffic or utility pole health, thus evolving to a new era of Infrastructure as a Sensor (IaaSr), which can also be called Network as a Sensor (NaaSr). To this end, large network carriers may soon devote their time and investment to upgrade their network infrastructures to include such IaaSr services, in order to improve their operation efficiency, and to further increase their profit and market share. When network carriers upgrade their infrastructures with DFOS to provide IaaSr services, there will arise a critical challenge: how to deploy DFOS sensors to cover the whole network infrastructures with minimum cost of DFOS sensors. This is the so-called DFOS sensor placement problem.

Previously, we have described the world first DFOS sensor placement procedure in United States Patent Application Publication No. 2022/0057254A1, the entire contents of which is incorporated by reference as if set forth at length herein.

More recently, as the DFOS technique advances, there emerges a new type of DFOS sensor that is equipped with multiple sensing ports which can be used to establish multiple sensing fiber channels/routes simultaneously. This brings new challenges to optimize the DFOS sensor placement. In the previous invention, to achieve the minimum number of DFOS sensors is the same as minimizing the number of sensing fiber routes. However, in this new problem, solutions with more sensing fiber routes might actually lead to fewer sensor units, if multiple routes share a same sensor unit (compared to the solutions that have fewer sensing fiber routes but requires more sensor units at different locations). Therefore, the previous invention cannot be directly applied to achieve the minimum cost of DFOS sensors in this new situation.

In this disclosure, we now describe a modified version of our previous method we call "modified Explore aNd Pick" (mEnP) procedure, which can advantageously help network carriers deploy such new type of DFOS sensors (e.g., each DFOS sensor is associated with multiple sensing fiber routes/channels) to cover/sense the whole network infrastructures with minimum number of DFOS sensors used. Our improved procedure/method described herein allows network carriers to determine (1) where to place the DFOS sensors and (2) how to establish sensing fiber routes/channels from the deployed sensors.

Advantageously, our inventive, improved procedure determines where to place the sensors and how to establish sensing fiber routes/channels from the deployed sensors, with the goal of covering/sensing all the network links in the network infrastructure with the minimum number of sensors.

Our improved procedure includes two sub-procedures. The first sub-procedure adopts a modified route exploration method from our previous work to obtain a set S that contains all the possible sensor placements and the corresponding sensing fiber routes/channels at each node in the given network infrastructure. The second sub-procedure further improves our prior technique and applies a modified greedy set cover method to find the minimum subset from S that can cover all the network links in the given network infrastructure.

As we shall show and describe our inventive procedure according to aspects of the present disclosure achieves a close-to-minimum cost of deploying DFOS sensors to achieve fully IaaSr service coverage in a network infrastructure, when each DFOS sensor is associated with multiple sensing fiber routes/channels.

Additionally, our inventive procedure according to aspects of the present disclosure provides a guideline about where to place DFOS sensors to achieve full, IaaSr service coverage in a telecommunication network infrastructure.

Figure 2:
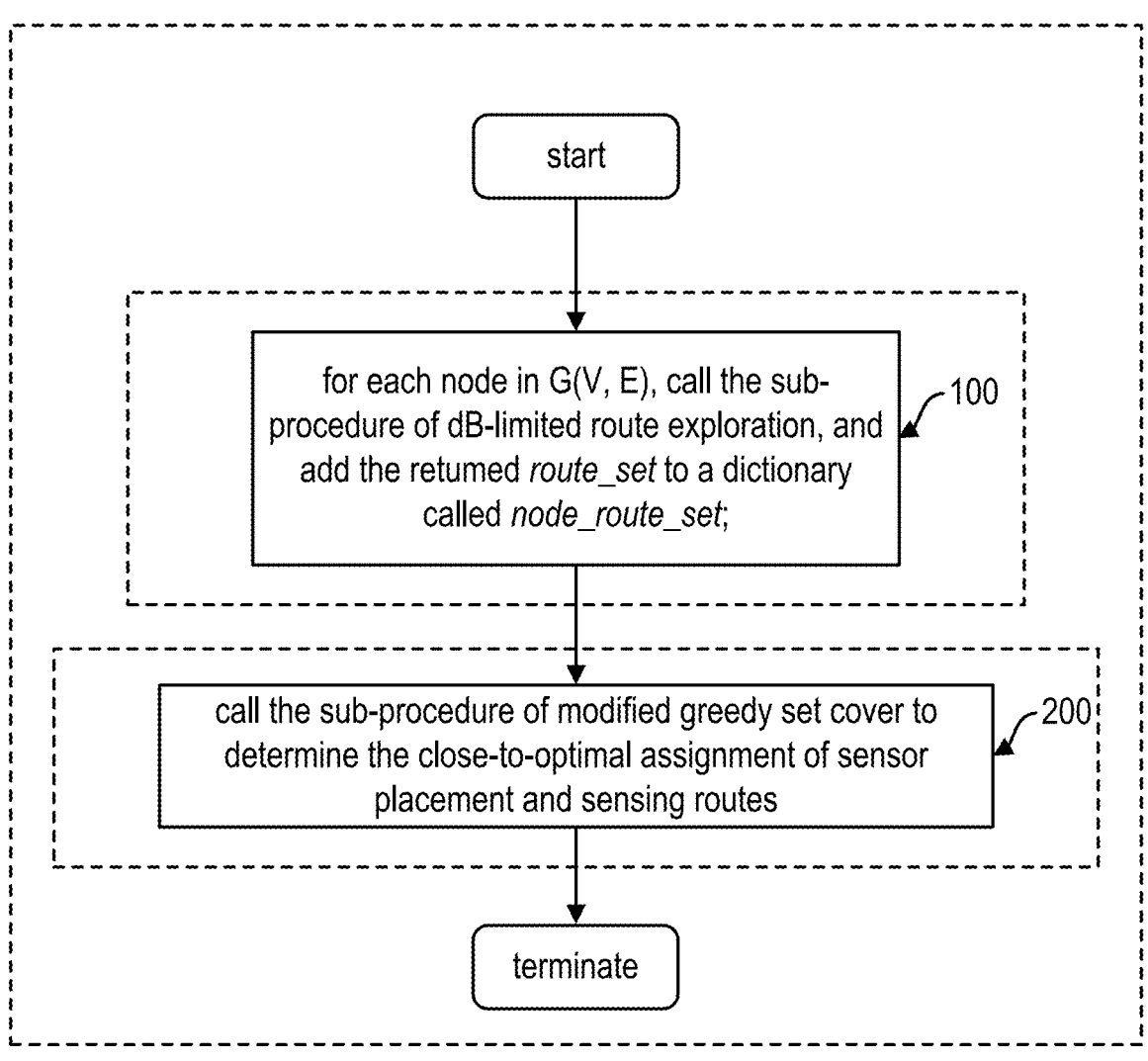
FIG. 2 is a schematic flow diagram showing an illustrative overall method operation according to aspects of the present disclosure.

Finally, our inventive procedure according to aspects of the present disclosure provides a guideline about how to establish the sensing fiber routes/channels to achieve fully IaaSr service coverage in a telecommunication network infrastructure FIG. 2 is a schematic flow diagram showing an illustrative overall method operation according to aspects of the present disclosure.

The Procedure for DFOS Placement

Our overall inventive procedure includes two main step, which are step 100 and step 200, as shown in FIG. 1.

Step 100: this step is the first sub-procedure in the proposed solution, which is the modified route exploration from our prior procedure noted previously. Note that one different step between our instant disclosure and that we disclosed previously is in Step 112, where our prior disclosure considers distance as a constraint factor, while the current/instant disclosure/invention considers attenuation (optical signal loss, usually expressed in the unit of dB) as a constraint factor. (We note that it is still OK to use distance limit as the constraint factor, as this will not affect our novel features described herein.

However, we note that as we now disclose, it is more practical to use fiber attenuation as the constraint factor, since different fibers deployed in the field might have different fiber attenuation characteristics, and different installation work might cause different loss figures, therefore it is best to use the overall attenuation as the parameter to consider in the sensor placement planning).

This sub-procedure to obtain all the possible sensing routes (denoted by route_set) for node n if we deploy a sensor on it. Iteratively, each node's route_set will be obtained and added to a dictionary called node_route_set, which contains all the possible assignments for sensor placement and the corresponding sensing fiber routes/channels. When all the nodes have been checked and their corresponding route_set have been added to node_route_set, we will proceed to step 200, where node_route_set will be used as the input for step 200.

Figure 4:
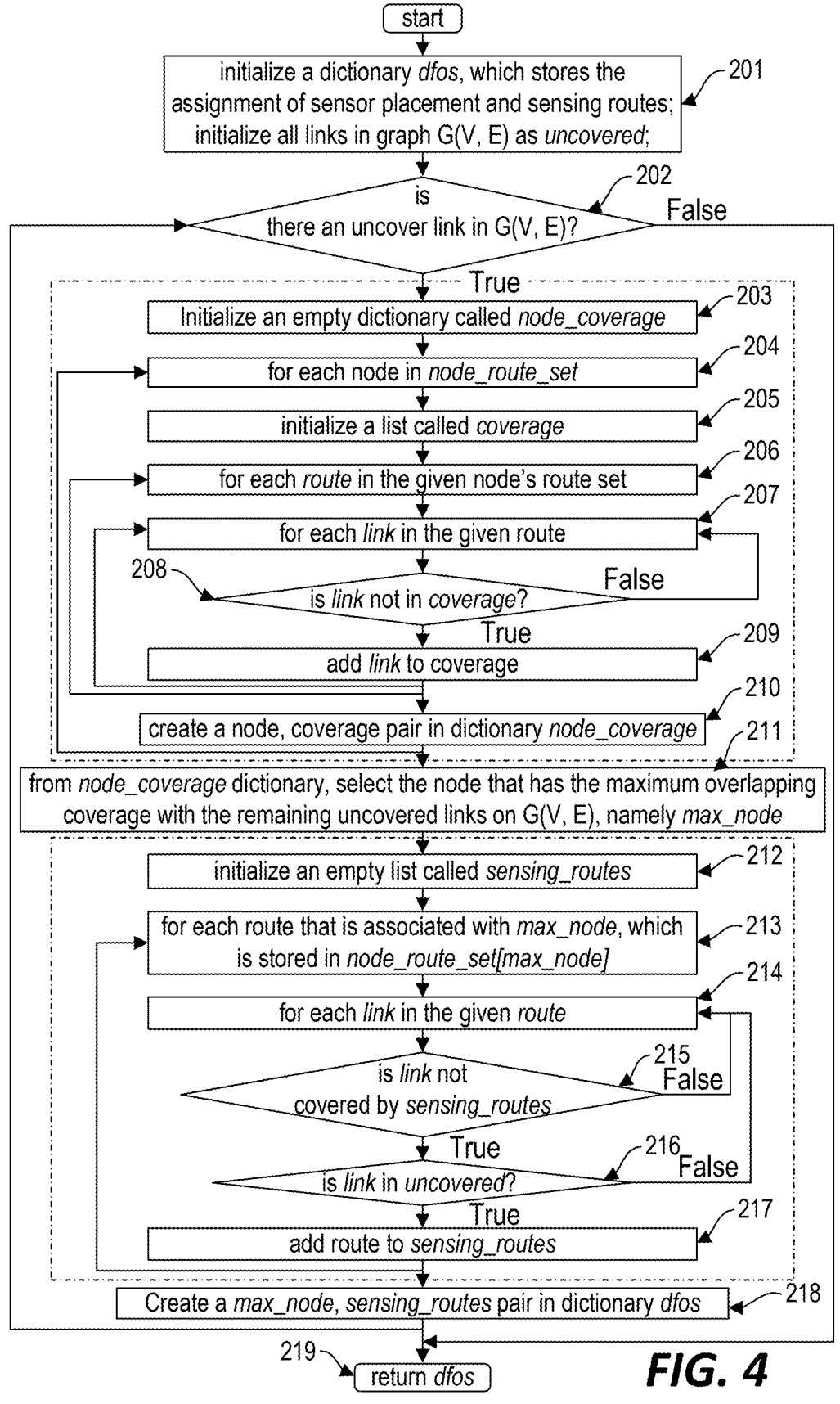
FIG. 4 is a schematic flow diagram showing an illustrative second sub-procedure according to aspects of the present disclosure.

Step 200: this step is the second sub-procedure in the proposed solution, which is denoted by modified greedy set cover. Note that this sub-procedure is novel, which is distinguished from our prior procedure noted. All the detailed steps in this second sub-procedure are explained from step 201 to step 219 as shown in FIG. 4.

From all the possible node-sensing fiber routes pairs in node_route_set, the second sub-procedure will adopt a modified greedy set cover method and find out the minimum subset that makes sure each and every link in the given network infrastructure can be covered at least once.

Figure 3:
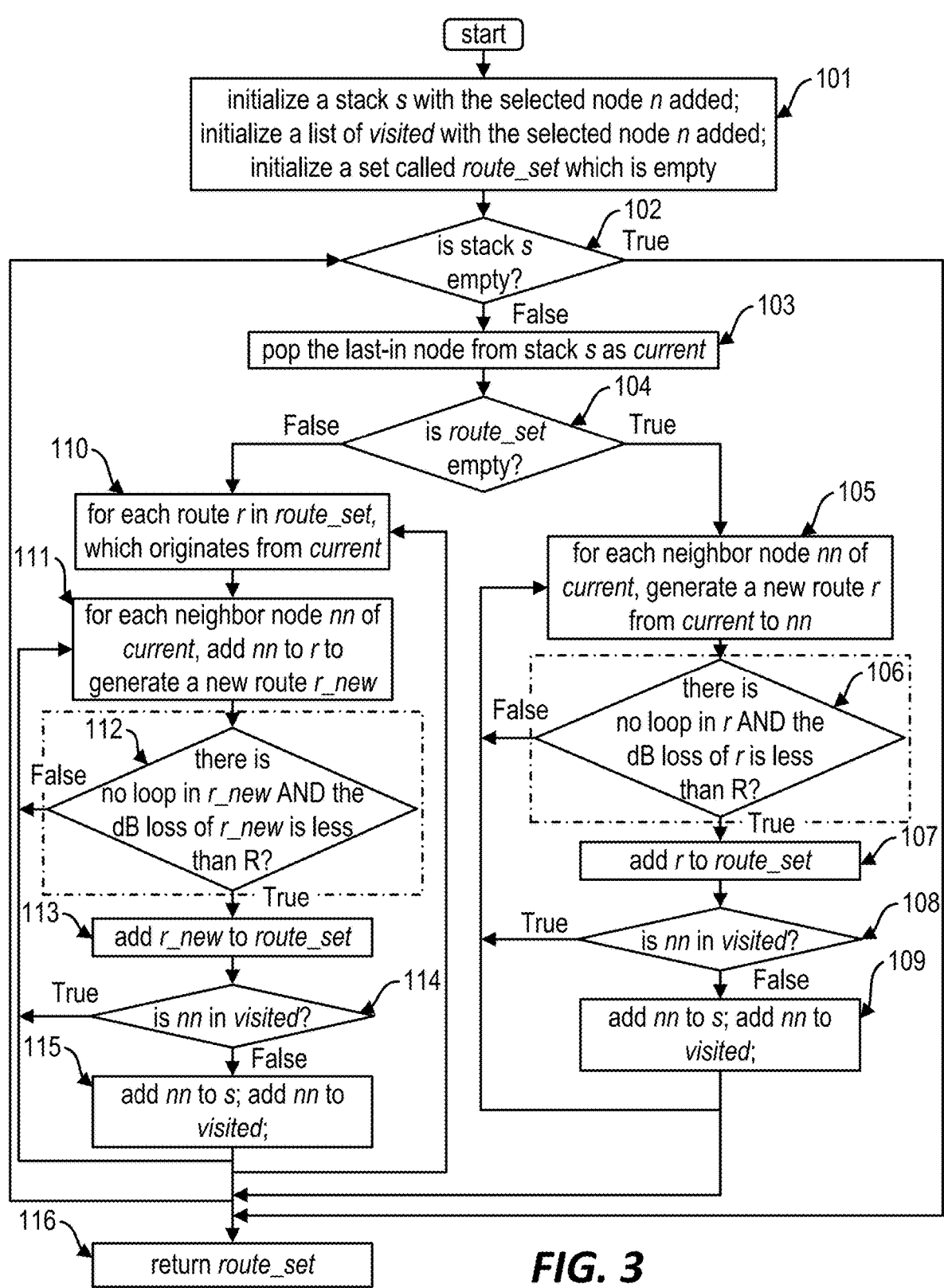
FIG. 3 is a schematic flow diagram showing an illustrative first sub-procedure according to aspects of the present disclosure.

FIG. 3 is a schematic flow diagram showing an illustrative first sub-procedure according to aspects of the present disclosure.

The modified route exploration sub-procedure: we note that Step 112 is different from our prior work disclosed previously, while the rest remains substantially the same.

Step 101: this step is the initialization step of the sub-procedure of depth-limited route exploration. Three data structures are created and initialized. First, a stack s is created to store all the nodes that need to be visited for the given node n. The stack will be initialized with the given node n, and it will be added with additional nodes when the nodes meet certain conditions (see step 106 and 108, and step 112 and 114). Secondly, a list called visited will be initialized to keep track of the nodes that have been visited during the depth-limited route exploration process. This will ensure that there will be no duplicated sensing route in the final DFOS assignment. The list is initialized to contain the given node n. Finally, a set called route_set is initialized as empty, which will contain all the possible sensing routes if we deploy a sensor at the given node n.

Step 102: this step is the entering point of a while loop. It will check if stack s is empty or not. If the stack is not empty, it will enter the while loop and continue to step 103. If the stack is empty, it will quit the while loop and go to step 116 and return the route_set for the given node n. Here, when the stack is empty, it means that all the neighboring nodes that are within the sensing limit R for the given node n have been checked, so route_set contains all the possible sensing route for the given node n.

Step 103: this step will pop up the last-in node from stack s, and denoted it as node current. This current node shows where the current exploration is located at. Future steps will determine whether or not to add current and its neighbors as a possible sensing routes in route_set.

Step 104: this step will check if set route_set is empty or not. If it is empty, we will consider node current to be the original node of the sensing route and further explore any other possible sensing routes, as we proceed to step 105. If route_set is not empty, then we will check the routes from route_set whose predecessor is current, and further explore any other possible sensing routes, as we proceed to step 110.

Step 105: this step is the entering point of a for-loop. We need to check each neighbor node nn of current and generate a route r from current to nn. This route will be checked in step 106 to determine whether or not it will be added to route_set.

Step 106: this step checks the condition of route r that is extended from current to nn. The condition is that route r must be a linear route that contains no loop, and in the meantime, the distance traveled by r is less than the sensing range limit R. If route r satisfies the above condition, we will add r to route_set as shown in step 107. If the condition is not met, the procedure will go back to step 105 and check the next neighbor node and its corresponding newly generated route.

Step 107: this step will add the route r to the set of route_set.

Step 108: this step will check if neighbor node nn has been visited or not. If nn has been visited before, then we will go back to step 105 and check the next neighbor node. If nn has not been visited, then we go to step 109.

Step 109: this step will add neighbor node nn to stack s, which allow us to further explore any other possible sensing route extended from this node. In this step, we will also add nn to the list of visited.

Step 110: this step will be executed when the condition in step 104 is not met. It is the entering point of the outer loop of a double for-loop. Here, we need to check each existing sensing route r in the set of route_set, and proceed with the ones that originate from node current.

Step 111: this step is the entering point of an inner loop of a double for-loop. We need to check each neighbor node nn of current and generate a new route r_new that is constructed by adding node nn to the existing sensing route r.

Step 112: this step checks whether or not route r_new is a linear route without a loop, and in the meantime, the distance traveled by r_new is less than the sensing limit R. If the above condition holds true, then we proceed to step 113, where we add r_new to route_set. If the condition is not met, the procedure will go back to step 111 and check the next neighbor node and its corresponding newly generated route.

Step 113: this step will add the route r_new to the set of route_set.

Step 114: this step will check if neighbor node nn has been visited or not. If nn has been visited before, then we will go back to step 111 and check the next neighbor node. If nn has not been visited, then we go to step 115.

Step 115: this step will add neighbor node nn to stack s, which allow us to further explore any other possible sensing route extended from this node. In this step, we will also add nn to the list of visited.

Step 116: this step will be executed when the condition in step 102 holds true. It will return set route_set to where the procedure was called in the first sub-procedure in step 100.

FIG. 4 is a schematic flow diagram showing an illustrative second sub-procedure according to aspects of the present disclosure.

As illustrated in FIG. 4, our inventive modified greedy set cover procedure is described. Of particular focus, steps 203 to 210 obtain the links that can be covered when a DFOS sensor node is deployed in each network node. Steps 211 determines which network node should have a DFOS sensor to deploy, and steps 212 to 217 determines the sensing fiber routes/channels from the selected network node. The above noted steps are particularly differentiated from our prior work.

Step 201: this step is the initialization phase of the second sub-procedure. Two data structures will be created. First, we will initialize an empty dictionary called dfos. This dictionary stores two information, including where to place the DFOS sensors and how to establish sensing fiber routes/channels. Secondly, we will mark each network link in the given network infrastructure to be as uncovered and save them in a list called uncovered.

Step 202: this step is the entering point of a while loop and it checks whether or not there exists a link that is still marked as uncovered. If the condition holds true, we proceed to execute steps 203 through 218; otherwise, we proceeds to step 219 and returns dfos. Here, if there still exists uncovered links, we need to continue to deploy more sensors to cover those links, which is the reason why we need to proceed to the while loop body between step 203 and step 218. This ensures that the procedure terminates when the whole network infrastructures are fully covered by DFOS sensors and their sensing fiber routes.

Step 203: this step initializes an empty dictionary called node_coverage. It is storing a number of key-value pairs, where the keys are the network nodes in the given network infrastructure and the values are the network links that can be covered/sensed when a DFOS sensor is deployed in a network node, given the attenuation limitation (in dB). At the beginning dictionary node_coverage is empty. It will grow by adding each network node and the links that can be covered if a DFOS sensor is deployed in that node through steps 204 to 210.

Step 204: this is the entering point of a FOR loop. It will check each node in the given input dictionary node_route-_set that is achieved from step 100. Each node will be added as a key to the dictionary node_coverage.

Step 205: this step will initialize a list called coverage. For each network node, we need to find out the links that can be covered/sensed if a DFOS sensor is deployed in the given node. At the beginning, the coverage is unknown, so we set it to be empty. Steps 206 through steps 209 are used to obtain the coverage for each node.

Step 206: this step is an entering point of a FOR loop. It will check each sensing fiber route for a given network node. The sensing fiber routes information are already obtained in step 100. So, here, the proposed method will go over each found sensing fiber route one by one.

Step 207: this step is an entering point of a FOR loop. It will check each link that is traversed by the given route. As we know, each sensing fiber route may span across multiple network links. Hence, in this step, the proposed method checks each link in the given route.

Step 208: this step checks if the given link is not included in the list of coverage. If the link is not included in coverage yet, then proceed to step 209; otherwise, go back to step 207 to continue to check the next link in the given route. As we know, the sensing fiber routes/channels originated from a given network node may have some overlaps, meaning that certain network links may be covered more than once by different sensing fiber routes. Here, step 208 will make sure that the overlapping network links will only be counted once as in coverage.

Step 209: this step adds the given link to the list of coverage.

Step 210: this step creates a key-value pair in the dictionary of node_coverage. Here, each key-value pair corresponds to a node and its coverage. Here, a node corresponds to each node in the node_route_set, and the coverage consists of the links that can be covered if a DFOS sensor is placed at the given node. In the meantime, coverage is obtained through steps 206 to 209, which ensure that overlapping links is only considered once for each node's coverage.

Step 211: this step adopts the classical greedy set cover algorithm to determine where to place a DFOS sensor. Considering all the nodes and their coverage, this step applies greedy set cover algorithm to find out the node that has the maximum overlapping coverage with the remaining uncovered links that are obtained from list uncovered. The found node is denoted as max_node, and a DFOS sensor is to be deployed on this node.

Step 212: this step initializes an empty list called sensing_routes. After a node max_node is determined to be deployed with a DFOS sensor, the proposed procedure needs to determine the sensing fiber routes/channels originated from the selected node, through steps 213 to 217.

Step 213: this step is the entering point of a FOR loop. It will check each sensing fiber routes that is associated with the selected max_node, where a DFOS sensor will be deployed. All the nodes and their corresponding possible sensing fiber routes are found in step 100 and stored in the dictionary node_route_set. So, given the max_node, we can access its corresponding sensing fiber routes in the given dictionary by node_route_set [max_node]. Note that not all the possible sensing fiber routes/channels at node max_node will be considered; only the sensing fiber routes/channels that will lead to sense/cover the uncovered links will be considered for establishing new sensing fiber routes. This is achieved by the filtering steps from steps 214 to 216.

Step 214: this step is the entering point of a FOR loop. It will check each link in the given sensing fiber route and determine if a sensing fiber route/channel from the selected node max_node will be considered in the final sensing fiber route assignments.

Step 215: this step checks if the given link is not yet covered by other sensing fiber routes that are already in sensing_routes. If yes, proceeds to step 216 for further check; otherwise, go back to step 214 to check the next link in the given route.

Step 216: this step checks if the link is still not covered (e.g., it is still in uncovered). If yes, proceed to step 217; otherwise, go back to step 214 to check the next link in the given route.

Step 217: this step adds the given route to sensing_routes. After the filtering steps of 215 and 216, only the routes that contain uncovered links will be considered for establishing sensing fiber routes/channels.

Step 218: this step creates a new key-value pair in the result dictionary dfos. Here, the key is the found network node max_node where a DFOS sensor will be deployed, and the value is the sensing_routes that contains only the sensing fiber routes from max_node that will lead to sense/cover the uncovered links in the given network infrastructure.

Step 219: this is the last step of the second sub-procedure. It will return the DFOS placement assignment, including where to place the sensors and the corresponding sensing fiber routes/channels assignment.

The Application of the DFOS Placement Procedure

Figure 5:
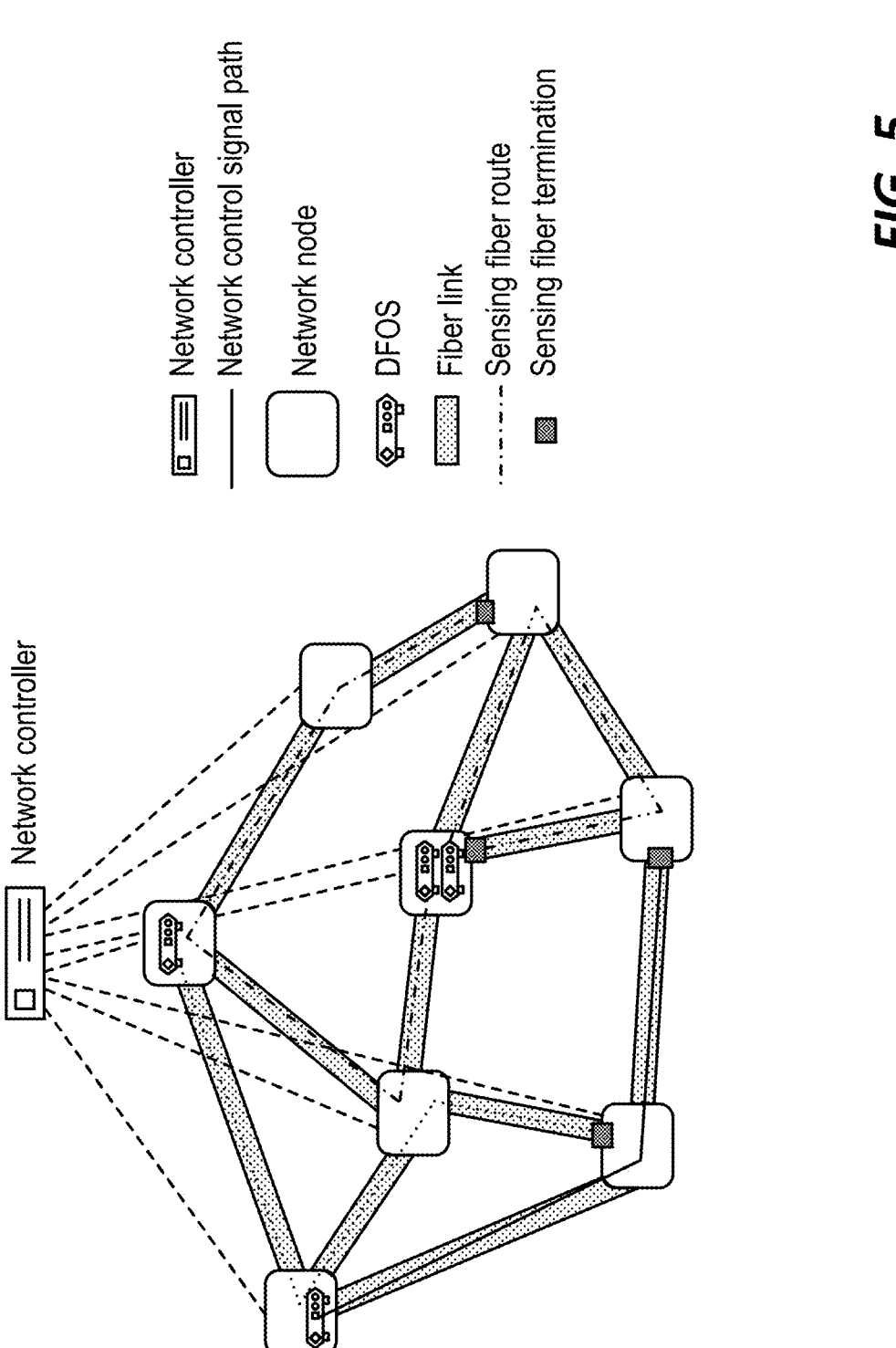
FIG. 5 is a schematic block diagram showing an illustrative application of our inventive DFOS placement procedure in a fiber optic sensing network according to aspects of the present disclosure.

FIG. 5 is a schematic block diagram showing an illustrative application of our inventive DFOS placement procedure in a fiber optic sensing network according to aspects of the present disclosure.

As may be observed in this figure, there are multiple nodes in the fiber optic network, and there are multiple fiber optic links between some nodes. The highlighted fiber optic links are those links that need to be monitored (sensed) by the DFOS sensors (it could be all fiber optic links in the network).

These optical nodes are controlled by a network controller, which can be placed at one of the nodes, or can be in a remote location or multiple locations. The network information, including the network topology, information of each node, information of each link (such as the two end nodes, the link distance, whether sensing is required on this link), and so on, are collected by the network controller. Based on the information, the network controller uses the DFOD placement procedure to decide the network configuration for sensing purpose. The configuration settings are then sent to individual nodes.

When an optical node receives the respective network configuration instructions, it executes the instructions, which could include placing one or more DFOS sensor hardware at the node and connecting them to the respective fiber, and/or connect two fibers from two links together to form a pass-through path (this can be done via a fiber patch panel or optical switch), and/or terminate a fiber to prevent large reflection at the end surface of the termination point.

Each deployed DFOS sensor also uses the instruction from the network controller to configure the sensing distance and any related parameters, then start the on-going measurement. The collected data are separated into individual links, if the sensor's sensing range spans across multiple hops. The measure data for each fiber link can be stored and processed locally or can be sent to remote or centralized processor to be analyzed or stored.

Due to the resource optimization advantage of the DFOS placement procedure, the number of DFSO sensors in the network can be kept low, saving the hardware expense and the operation cost. Since all the required links in the network are performing sensing function continuously, the IaaSr (NaaSr) function is achieved, which will improve the network operation efficiency (such as preventing cable cut, monitoring cable health, monitoring operation environment), and bring new service and revenue to the network owner (such as providing traffic information to municipal government, monitoring road condition for highway operator, monitoring utility pole health for utility company, monitoring city noise for accident detection, etc.).

Field Implementation

Figure 6B:
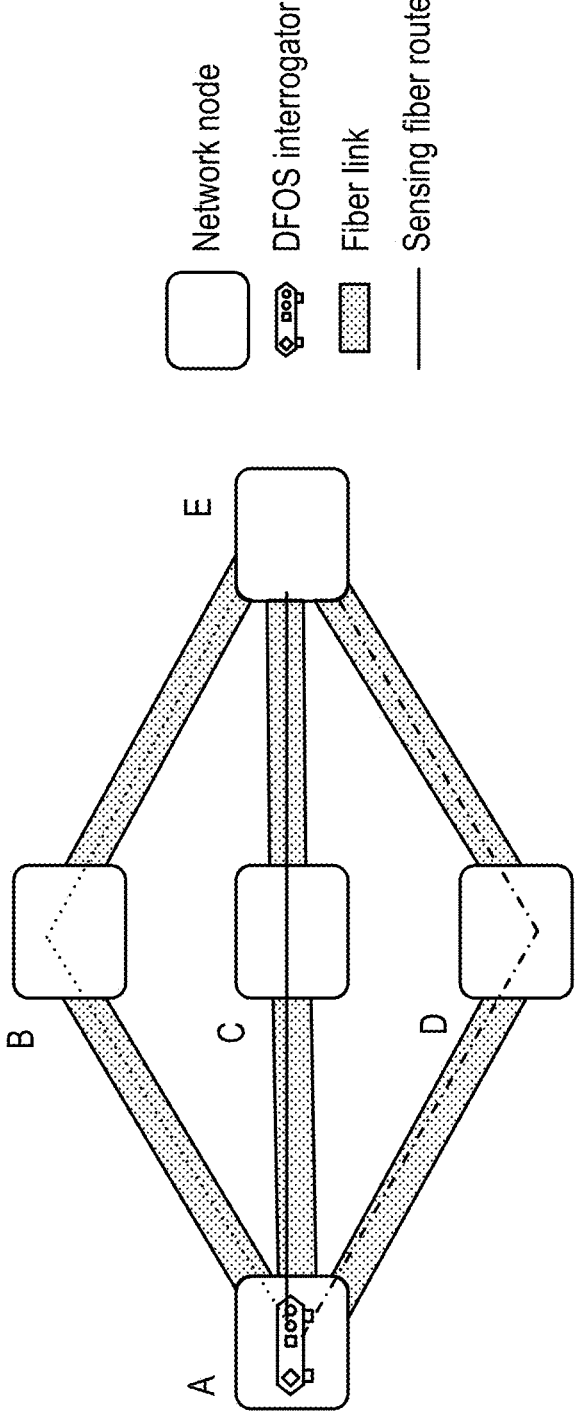

FIG. 6(A) and FIG. 6(B) are schematic diagrams showing illustrative examples of: FIG. 6(A) single-channel sensor placement vs FIG. 6(B) multi-channel sensor placement according to aspects of the present disclosure.

Multi-Channel Sensor Placement Problem and Algorithm

In our previous method, the goal of minimizing the number of sensors is the same as minimizing the number of sensing routes, since each sensor can only sense a single route. However, for multi-channel sensors, these two goals are no longer the same. To reach the goal of minimizing the sensor numbers (i.e. to minimize the hardware cost), more sensing routes might be required.

As shown in the examples of FIG. 6(A) and FIG. 6(B), a 5-node network could be covered using 2 single-channel sensors and 2 sensing routes ABEC and CADE (FIG. 6(A)). With multi-channel sensor, only one sensor is required, but the number of sensing routes becomes 3 (ABE, ACE and ADE in FIG. 6(B)).

The multi-channel sensor placement problem is defined as follows. Given a network infrastructure that has V nodes interconnected by E (optical fiber) links, the goal is to determine the optimal placement of multi-channel sensors and the corresponding sensing routes assignment with the objective of covering all of the E links using the minimum number of multi-channel sensors. Compared to the single-channel sensor placement problem, the multi-channel sensor placement problem is more challenging, since we need to determine not only the optimal combination of sensor placement, but also the optimal combination of sensing routes per sensor.

We now disclose a new algorithm called maximum coverage-based (MCB) heuristic algorithm to solve this problem. It first uses depth-first search to enumerate all the available sensing routes that are within the sensing range limit for each network node. Secondly, the algorithm greedily selects the network node, which is associated with sensing routes that has the maximum overlapping with the uncovered links, for deploying multi-channel sensor. Thirdly, the algorithm sorts all the available sensing routes originated from the above selected sensor location, according to the number of overlapping links between a sensing route and the uncovered links. After that, the algorithm selects the top N sensing routes for deployment. Here, N is the smaller number between the maximum number of channels a sensor can support, and the number of available sensing routes found at the selected node. The algorithm will repeat the above three steps to deploy multi-channel sensors and allocate sensing routes until each network link is covered at least once by a sensing route. The pseudocode of the algorithm is shown in FIG. 7 which is a pseudo-code listing of Algorithm 1—Maximum Coverage-Based (MCB) Algorithm according to aspects of the present disclosure.

Simulation and Analysis

Simulations are conducted to validate the proposed solution using four regional or metro fiber optical networks from real-world datasets. Since the average node degree in these networks is only 2.4, a 4×4 mesh network with average node degree 3 is also considered for comparison.

FIG. 8(A) and FIG. 8(B) show in tabular form: FIG. 8(A) simulation network parameters, and FIG. 8(B) simulation results or our experimental efforts, according to aspects of the present disclosure.

The network parameters are listed in FIG. 8(A). To make the condition closer to the actual field operation, the sensing range is changed from distance to optical power budget, since fiber conditions in the field are non-uniform and therefore the interrogator's specification is typically associated with the optical power level instead of the distance. Also, a loss is added to each bypassing node to better represent the real condition.

We compare three single-channel solutions (namely ILP, Random-Fit, and EnP) with the new multi-channel MCB solution in terms of the number of sensors used. The channel number is set to 16, the node loss is 1.5 dB, the fiber attenuation is 0.2 dB/km, and the optical power budget for the sensor is 20 dB. The results are shown in FIG. 8(B). We can see that the MCB solution can achieve fewer sensors for all cases with saving up to 67%, and the computation is very fast (within a second on a regular computer) even for large networks. The amount of sensor saving from the multi-channel feature varies among these networks. This is related to the network topology, which can be generally represented by the average node degree. For ION network whose average degree is only 1.94, the improvement is only 53%, but for the 4×4 network with an average degree of 3, the improvement reaches 67%.

Figure 9B:
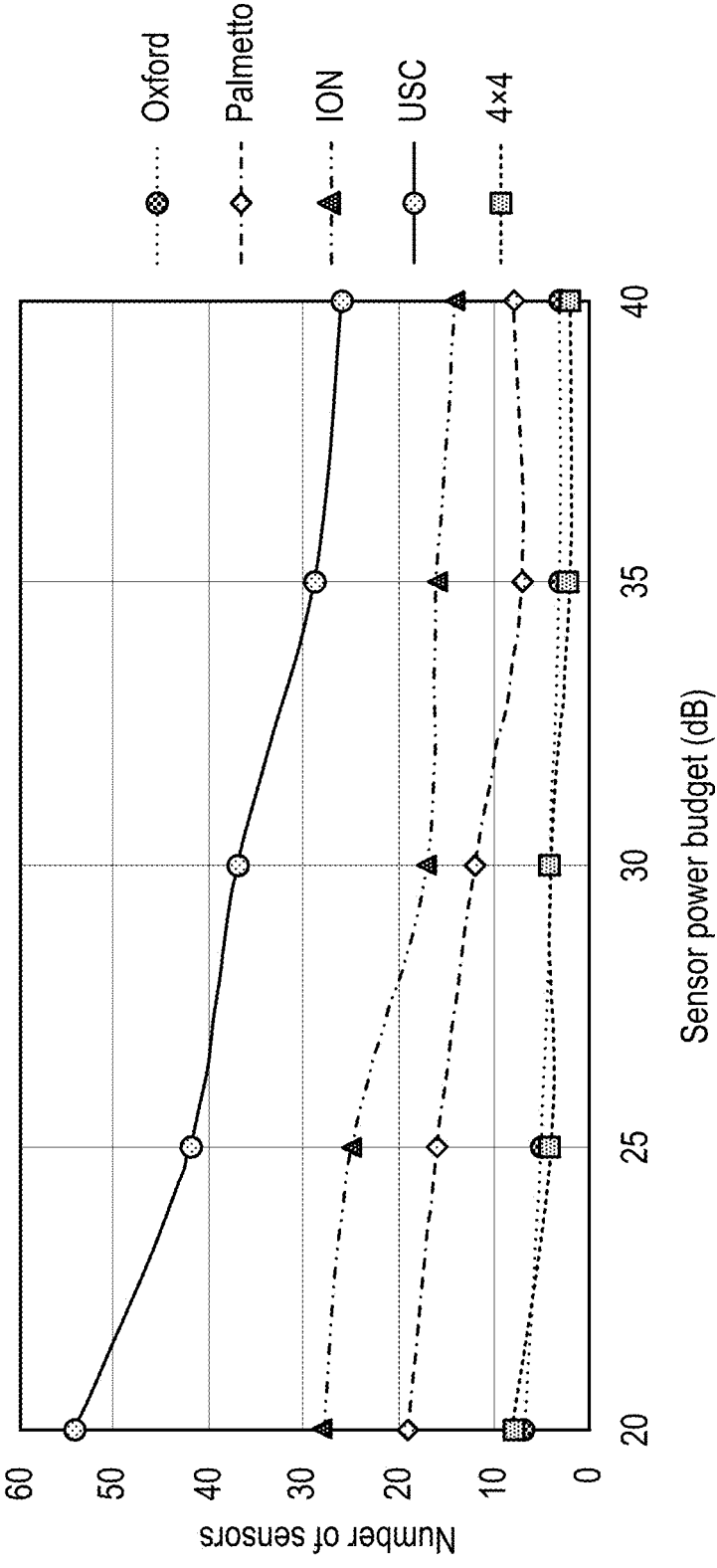

FIG. 9(A) and FIG. 9(B) are a pair of plots showing illustrative sensor placement analysis of: FIG. 9(A) sensor number vs. channel number, and FIG. 9(B) number of sensors vs sensor power budget, according to aspects of the present disclosure.

We then study the effect of sensor channels. We vary the channel per sensor from 1 (i.e. single-channel case) to 16. As shown in FIG. 9(A), the sensor saving is significant at the beginning, then gradually reduces, and eventually reaches an optimal level, indicating that sensor with more than 6 channels is generally not required for this application. The optimal channel number is higher for larger networks (6 for ION and USC) compared to smaller networks (4 for Oxford and 4×4).

We also compare the sensors needed under different power budgets from 20 dB to 40 dB, while keeping the number of channels at optimal level. The results in FIG. 9(B) show that the required sensor number reduces as the power budget increases, which is as expected. The saving is from 50% for ION to 75% for 4×4 network. Comparing with 20 dB single-channel case, the saving is between 76.7% and 91.7%. And under 40 dB power budget, the saving from single-channel sensor to multi-channel sensor is between 63.2% for ION and 81.8% for 4×4 network. Therefore, improving the sensor capability, such as increasing the dynamic range of the sensor receiver, can better utilize the multi-channel sensing scheme While we have presented our inventive concepts and description using specific examples, our invention is not so limited. Accordingly, the scope of our invention should be considered in view of the following claims.

The invention claimed is:

1. A distributed fiber optic sensor placement method comprising:

providing a fiber optic network comprising a set of nodes and a set of fiber optic links defined by G(V, E) where G is the fiber optic network, V is the set of nodes, and E is the set of links;

for each node in G(V, E), determine all possible sensing routes (node_route_set) in the fiber optic network; and determine the minimum set of sensing routes in the node_route_set that fully cover all the links in the fiber optic network; and determining sensor placement locations to be at either one of two ends of a sensing route that is within the minimum set of sensing routes in the node_route_set that fully cover all the links in the fiber optic network; and deploying the sensors at the sensor placement locations so determined;

wherein a route is only added to node_route_set when that route simultaneously contains no loop and an attenuation (dB) of the route is less than a predetermined threshold.

2. The method of claim 1 further comprising:

determining a set of possible sensing routes for a given node in the fiber optic network when there is no existing sensing route defined for the given node.

3. The method of claim 1 further comprising determining a set of possible sensing routes for a given node in the fiber optic network when there are existing sensing routes defined for the given node.

4. The method of claim 1 further that a route is only added to node_route_set when that route exhibits a distance less than a sensing range limit of the sensor being placed.

5. The method of claim 1 wherein the number of sensors deployed is defined by:

$$\text{min:} \sum_{s,d \in V} \theta_{s,d}$$

for the network infrastructure G(V, E), where V is the set of nodes; E is the set of links; R: the sensing range limit of a given sensor; $d_{ij}$: the distance of link (i, j); $w_{ij}$: the distance of the weight of link (i, j), which is obtained by $d_{ij}/R$;

wherein the following Boolean variables are determined:

$\theta_{s,d}$: 1 if a sensor is deployed at node s, with termination point at node d, where s, d∈ V; 0 otherwise;

$r_{s,d,i\ j}$: 1 if the sensing fiber route between s and d passes though link (i,j), where $r_{s,d,i\ j}$∈ V; 0 otherwise;

and the following constraints are considered:

$$\sum_{i,j \in V} r_{s,d,i,j} \cdot w_{i,j} \le \theta_{s,d}, \forall\, s, d \in V$$

$$\sum_{s,d \in V} r_{s,d,i,j} + \sum_{s,d \in V} r_{s,d,j,i} \ge 1, \forall\, i, j \in V$$

$$\sum_{i,j \in V} r_{s,d,i,j} - \sum_{i,j \in V} r_{s,d,j,i} = \begin{cases} \theta_{s,d} & i = s \\ -\theta_{s,d} & i = d \\ 0 & \text{otherwise} \end{cases} \quad \forall\, s, d \in V.$$

\* \* \* \* \*